US012032859B2

(12) United States Patent
Diaz-Cuellar et al.

(10) Patent No.: US 12,032,859 B2
(45) Date of Patent: Jul. 9, 2024

(54) PINNED PHYSICAL MEMORY SUPPORTING DIRECT MEMORY ACCESS FOR VIRTUAL MEMORY BACKED CONTAINERS

(71) Applicant: Microsoft Technology Licensing, LLC, Redmond, WA (US)

(72) Inventors: Gerardo Diaz-Cuellar, Redmond, WA (US); Omar Cardona, Redmond, WA (US); Jacob Kappeler Oshins, Redmond, WA (US); John Starks, Redmond, WA (US); Craig Daniel Wilhite, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 18 days.

(21) Appl. No.: 17/628,117

(22) PCT Filed: Aug. 25, 2020

(86) PCT No.: PCT/US2020/047849
§ 371 (c)(1),
(2) Date: Jan. 18, 2022

(87) PCT Pub. No.: WO2021/041444
PCT Pub. Date: Mar. 4, 2021

(65) Prior Publication Data
US 2022/0291875 A1 Sep. 15, 2022

(30) Foreign Application Priority Data
Aug. 26, 2019 (LU) .................................. LU101360

(51) Int. Cl.
*G06F 3/06* (2006.01)

(52) U.S. Cl.
CPC .......... *G06F 3/0664* (2013.01); *G06F 3/0604* (2013.01); *G06F 3/0631* (2013.01); *G06F 3/0673* (2013.01)

(58) Field of Classification Search
CPC .... G06F 3/0664; G06F 3/0604; G06F 3/0631; G06F 3/0673; G06F 9/455;
(Continued)

(56) References Cited

U.S. PATENT DOCUMENTS 6,799,200 B1 * 9/2004 Blackmore ......... G06F 12/1081
709/212
8,327,083 B2 12/2012 Jacobs et al.
(Continued)

OTHER PUBLICATIONS

"Amazon ECS Supports Memory and CPU Limits at the Task Level", Retrieved from: https://aws.amazon.com/about-aws/whats-new/2017/12/amazon-ecs-supports-memory-and-cpu-limits-at-the-task-level/, Dec. 12, 2017, 3 Pages.
(Continued)

*Primary Examiner* — Sean D Rossiter
(74) *Attorney, Agent, or Firm* — Newport IP, LLC; Jacob P. Rohwer (57) ABSTRACT

Examples described herein generally relate to hosting virtual memory backed kernel isolated containers. A server includes at least one physical processor and at least one physical computer memory addressable via physical memory addresses. The at least one physical computer memory stores executable code configured to provide at least one host including a kernel and at least one kernel isolated container within the at least one host. The host allocates virtual memory having virtual memory addresses to a respective container of the at least one kernel isolated container. The host pins a subset of the virtual memory addresses to a subset of the physical memory addresses. The host performs a direct memory access operation or device memory-
(Continued)

mapped input-output operation of the respective container on the subset of the physical memory addresses. At least part of the physical computer memory that is not pinned is oversubscribed.

20 Claims, 7 Drawing Sheets

(58) Field of Classification Search
CPC ......... G06F 2212/206; G06F 2212/657; G06F 12/0284; G06F 12/126
See application file for complete search history.

(56) References Cited

U.S. PATENT DOCUMENTS

| | | | |
|---|---|---|---|
| 8,850,577 | B2 | 9/2014 | Lewis |
| 10,909,066 | B2 | 2/2021 | Zhu et al. |
| 2007/0177611 | A1* | 8/2007 | Armstrong .............. G06F 21/53 370/395.52 |
| 2012/0072619 | A1* | 3/2012 | Tsirkin ................ G06F 9/45558 718/1 |
| 2014/0380319 | A1* | 12/2014 | Haverkamp .......... G06F 9/4881 718/102 |
| 2015/0067087 | A1* | 3/2015 | Guerin .............. G06F 15/17331 709/212 |
| 2015/0156124 | A1* | 6/2015 | Tsuji ....................... H04L 47/20 370/230 |
| 2015/0370586 | A1* | 12/2015 | Cooper ............... G06F 12/0223 718/1 |
| 2017/0090800 | A1 | 3/2017 | Alexandrovich et al. |
| 2017/0286701 | A1* | 10/2017 | Kim ........................ G06F 9/545 |
| 2018/0006936 | A1* | 1/2018 | Lu ........................... H04L 45/74 |
| 2018/0088978 | A1 | 3/2018 | Li et al. |
| 2018/0227182 | A1 | 8/2018 | Patton et al. |
| 2018/0232141 | A1* | 8/2018 | Avraham ................ G06F 9/455 |
| 2019/0042329 | A1 | 2/2019 | Kakaiya et al. |
| 2019/0244140 | A1* | 8/2019 | Lee ......................... G06N 20/00 |
| 2019/0334862 | A1 | 10/2019 | Paul et al. |
| 2022/0272039 | A1* | 8/2022 | Cardona .............. H04L 45/566 |
| 2023/0034837 | A1* | 2/2023 | Suryanarayana ..... G06F 9/4401 |

OTHER PUBLICATIONS

Anderson, et al., "Performance Considerations of Network Functions Virtualization using Containers", In Proceedings of International Conference on Computing, Networking and Communications, Internet Services and Applications, Feb. 15, 2016, 7 Pages.
Poggemeyer, et al., "What's new in Hyper-V on Windows Server", Retrieved from: http://web.archive.org/web/20171028094117/https://docs.microsoft.com/en-us/windows-server/virtualization/hyper-v/what-s-new-in-hyper-v-on-windows, Sep. 21, 2017, 12 Pages.
Lohr, et al., "About Windows containers", Retrieved from: http://web.archive.org/web/20190528230404/https://docs.microsoft.com/en-us/virtualization/windowscontainers/about/, May 22, 2019, 9 Pages.
"Search Report and Written Opinion Issued in Luxembourg Patent Application No. LU101360", Mailed Date: May 25, 2020, 8 Pages.
"International Search Report and Written Opinion Issued in PCT Application No. PCT/US2020/047849", Mailed Date: Dec. 22, 2020, 11 Pages.
"International Search Report and Written Opinion Issued in PCT Application No. PCT/US2020/047849", Mailed Date: Jan. 25, 2021, 12 Pages.
Shields, Greg, "Virtual memory settings in Hyper-V Dynamic Memory", Retrieved from: https://searchservervirtualization.techtarget.com/tip/Virtual-memory-settings-in-Hyper-V-Dynamic-Memory, Oct. 19, 2010, 4 Pages.
Hudek, Ted, "Overview of Single Root I/O Virtualization (SR-IOV)", Retrieved from: http://web.archive.org/web/20170630225759/https://docs.microsoft.com/en-us/windows-hardware/drivers/network/overview-of-single-root-i-o-virtualization—sr-iov-, Apr. 20, 2017, 1 Page.
Hudek, et al., "RSS Hashing Types", Retrieved from: http://web.archive.org/web/20180218125410/https://docs.microsoft.com/en-us/windows-hardware/drivers/network/rss-hashing-types, Apr. 20, 2017, 7 Pages.
Macmichael, Duncan, "Virtual Machine Queue (VMQ) Overview", Retrieved from: https://web.archive.org/web/20190421033637/https://docs.microsoft.com/en-us/windows-hardware/drivers/network/virtual-machine-queue—vmq-, Apr. 20, 2017, 1 Page.
Cooley, et al., "Hyper-V Containers", Retrieved from: http://web.archive.org/web/20190121112629/https://docs.microsoft.com/en-us/virtualization/windowscontainers/manage-containers/hyperv-container, Sep. 13, 2018, 3 Pages.
Hudek, et al., "Receive Side Scaling", Retrieved from: http://web.archive.org/web/20180218093127/https://docs.microsoft.com/en-us/windows-hardware/drivers/network/ndis-receive-side-scaling2, Apr. 20, 2017, 2 Pages.
"Notice of Allowance Issued in U.S. Appl. No. 20767925.9", Mailed Date: May 16, 2023, 8 Pages.
"Office Action Issued in European Patent Application No. 20767925.9", Mailed Date: Jan. 11, 2023, 6 Pages.
Nakazawa Rina et al: "Towing Performance Degradation of Containers in the Case of Extreme Memory Over Commitment", 2017 IEEE 10th International Conference on Cloud Computing (Cloud) IEEE, Jun. 25, 2017, pp. 196-204.
Wei Zhang, et al.: "OpenNetVM", Hot Topics in Middleboxes and Network Function Virtualization, ACM, 2 Penn Plaza, Suite 701, New York, NY 10121-0701, Aug. 22, 2016, pp. 26-31.
International Search Report and Written Opinion issued in corresponding International Application No. PCT/US2020/047849 dated Nov. 13, 2020.
"Notice of Allowance Issued in European Patent Application No. 20767925.9", Mailed Date: Jul. 21, 2023, 8 Pages.
Decision to grant a European patent pursuant to Article 97(1) Received for European Application No. 20767925.9, mailed on Nov. 9, 2023, 02 pages.

* cited by examiner

PINNED PHYSICAL MEMORY SUPPORTING DIRECT MEMORY ACCESS FOR VIRTUAL MEMORY BACKED CONTAINERS

This application is a 35 U.S.C. § 371 National Phase of PCT Application No. PCT/US20/047849, titled "PINNED PHYSICAL MEMORY SUPPORTING DIRECT MEMORY ACCESS FOR VIRTUAL MEMORY BACKED CONTAINERS," filed on Aug. 25, 2020, which claims priority to Luxembourg Application Number No. LU101360 titled "PINNED PHYSICAL MEMORY SUPPORTING DIRECT MEMORY ACCESS FOR VIRTUAL MEMORY BACKED CONTAINERS," filed Aug. 26, 2019, both of which are assigned to the assignee hereof, and incorporated herein by reference in their entirety.

BACKGROUND

The present disclosure relates to computer virtualization, and more particularly to virtual memory backed containers.

Cloud services provide virtual machines (VMs) for customers to execute various applications. The virtual machines execute on a hardware server. Multiple virtual machines can execute on the same hardware server. Containers are used to isolate different processes. Virtualization of the computer hardware allow efficient use of resources such as physical processors and physical memory. That is, resources are assigned to processes as needed and are shared between different processes.

A virtual machine adds overhead at lower layer (e.g., layer 1 and layer 2) packet routing. Because multiple addressable processes are executing on the same physical machine, each in a separate container, a virtual machine uses a software switching mechanism (e.g., a virtual switch) to route packets to specific containers. A virtual switch, however, consumes processor cycles and reduces the processor cycles available for executing the processes within the containers and also contributes to latency.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a server for hosting kernel isolated containers. The server includes at least one physical processor. The server includes at least one physical computer memory addressable via physical memory addresses, the at least one physical computer memory storing executable code for execution by the at least one physical processor. The executable code is configured to provide at least one host including a kernel and at least one kernel isolated container within the at least one host. The executable code providing the at least one host is configured to allocate virtual memory having virtual memory addresses to a respective container of the at least one kernel isolated container. The executable code providing the at least one host is configured to pin a subset of the virtual memory addresses to a subset of the physical memory addresses. The executable code providing the at least one host is configured to perform a direct memory access operation or device memory-mapped input-output operation of the respective container on the subset of the physical memory addresses.

In another example, the disclosure provides a method of hosting kernel isolated containers on a server including at least one physical processor and at least one physical computer memory addressable via physical memory addresses. The method includes instantiating at least one kernel and at least one kernel isolated container within a host. The method includes allocating virtual memory having virtual memory addresses to a respective container of the at least one kernel isolated container. The method includes pinning a subset of the virtual memory addresses to a subset of the physical memory addresses. The method includes performing a direct memory access operation or device memory-mapped input-output operation of the respective container on the subset of the physical memory addresses.

In another example, the disclosure provides a non-transitory computer-readable medium storing computer executable instructions for performing the above method.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 3 is a schematic diagram of an example network architecture including kernel isolated containers with statically pinned physical memory, in accordance with an implementation of the present disclosure;

FIG. 3 is a schematic diagram of an example network architecture including kernel isolated containers nested with dynamically pinned physical memory, in accordance with an implementation of the present disclosure;

DETAILED DESCRIPTION

The present disclosure provides systems and methods for providing hardware level performance for kernel isolated containers backed by virtual memory. The kernel isolated containers are guest processes that operate on a host system (e.g., a server) for providing cloud services, web services, hardware as a service, or other network virtualization services. That is, the host system includes physical computing hardware including one or more physical processors and physical memory that is configured to execute guest processes. In an implementation, the guest processes are controlled by customers of the host system provider.

Hardware virtualization allows the host system to support multiple guest processes. The guest processes are isolated using containers. A container is a virtualization of a machine. A relatively simple process isolated container is a process on the host system that is associated with a host virtual NIC (vNIC). A kernel isolated container includes some elements of an operating system kernel to provide greater isolation of the contents of the container. In either case, the host system includes a virtual switch to distribute incoming data packets to the containers on the host system.

The use of a virtual switch adds a layer of overhead to the guest processes executing on the host system. Since the virtual switch is executed by the same processing resources that could otherwise execute the guest processes, the virtual switch consumes processing resources of the guest processes. The virtual switch also contributes to network latency as packets are switched both by a physical NIC and the virtual switch.

A server includes a physical network interface controller (NIC) configured for single root (SR) input-output virtualization (IOV), or SR-IOV. The NIC includes a physical NIC switch configured to distribute incoming data packets to a plurality of functions including a physical function and virtual functions. The virtual functions are assigned to containers to bypass the virtual switch and provide hardware level access to the containers. Due to the virtual memory backing model of kernel isolated containers, however, a kernel isolated container is typically unable to use hardware level access operations such as direct memory access (DMA) or memory-mapped input-output (MMIO) operations because the virtual memory for the container might be paged out of physical memory at any time. A DMA or MMIO operation on virtual memory that is paged out will result in a crash.

The present disclosure provides for pinning physical memory to the virtual memory allocated to a kernel isolated container. A memory manager processes requests to pin the physical memory to the virtual memory. As used herein, "pin" or "pinning" refers to at least temporarily fixing a virtual memory address to a physical memory address. Pinning can also be referred to as memory mapping. A pinned virtual memory address will not be paged out of physical memory until the virtual memory address is unpinned. The kernel isolated container executes a DMA and/or MMIO operation relying on the pinned physical memory addresses. The memory manager controls an amount of the physical memory pinned based on the DMA and/or MMIO operations configured for the container. Accordingly, the host system provides improved speed and throughput and/or reduced latency for containers while limiting allocation of physical memory to maintain container density and memory oversubscription.

Figure 1:
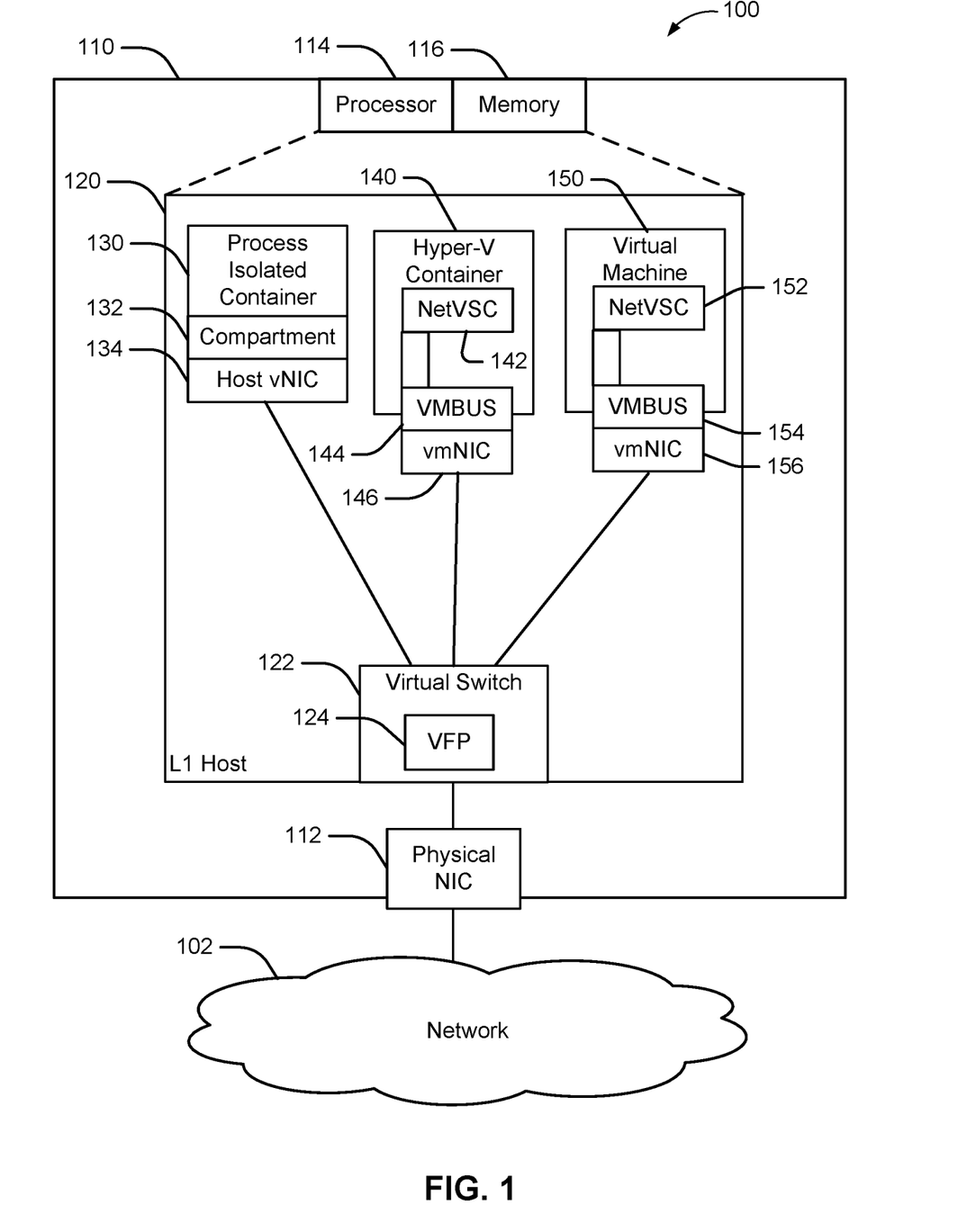
FIG. 1 is a schematic diagram of an example network architecture including containers.

Referring now to FIG. 1, an example host environment 100 includes a layer 1 host 120 executed on a physical host 110. The physical host 110 is connected to a network 102 (e.g., the Internet) via a physical NIC 112. The physical host 110 includes at least one physical processor 114 and a physical memory 116. The physical processor 114 and the physical memory 116 are considered computing resources, which are shared among multiple containers.

The physical host 110 includes, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of hosting a guest process.

The physical host 110 includes at least one physical processor 114 that executes instructions stored in memory 116. For example, the physical processor 114 executes one or more of an L1 host 120, which is an operating system for a virtualized device. That is, the L1 host 120 controls the processor 114 and memory 116, or a portion thereof. The physical NIC 112 routes network traffic to the L1 host 120.

Memory 116 is configured for storing data and/or computer-executable instructions defining and/or associated with the L1 host 120 and/or containers such as process isolated containers 130, kernel isolated containers 140, and virtual machines 150. Physical processor 114 executes the L1 host, the containers and/or applications within the containers. Memory 116 represents one or more hardware memory devices accessible to physical host 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 stores local versions of applications being executed by physical processor 114. In an implementation, the memory 116 includes a storage device, which includes a non-volatile memory.

The physical processor 114 includes one or more processors for executing instructions. An example of physical processor 114 can include, but is not limited to, any processor specially programmed as described herein, including a controller, microcontroller, application specific integrated circuit (ASIC), field programmable gate array (FPGA), system on chip (SoC), or other programmable logic or state machine. In an implementation, the physical processor 114 includes other processing components such as an arithmetic logic unit (ALU), registers, and a control unit. In an implementation, the physical processor 114 includes multiple cores and may be able to process different sets of instructions and/or data concurrently using the multiple cores to execute multiple threads.

In an aspect, the L1 host 120 configures one or more containers for hosting guest processes. A container includes application code and operating system elements necessary for the application code. An example guest process is a website provided by an application within a container. The L1 host 120 hosts multiple containers. For example, the containers include process isolated containers 130, kernel isolated containers 140, and virtual machines 150. The L1 host 120 includes a virtual switch 122 for routing network traffic to individual containers. The virtual switch 122 includes instructions executed by the physical processor 114 that simulate a physical switch. That is, the virtual switch 122 distributes network traffic among the containers, for example, based on packet headers. The virtual switch 122 includes a virtual filter platform (VFP) 124. The VFP 124 applies policies and access control lists (ACLs) of the L2 host 120 to the network traffic. For example, the VFP 124 can provide firewalling or control over what traffic is allowed to traverse the virtual switch 122. The VFP 124 can also provide rate limiting to control how much network traffic is allowed to traverse the virtual switch 122. The VFP 124 enforces per tenant resource caps for the containers.

A process isolated container 130 provides application isolation through process and namespace isolation. A process isolated container 130 shares a kernel with the container host (e.g., L2 host 120) and all containers running on the host. A process isolated container 130 does not provide a hostile security boundary. Accordingly, the process isolated container 130 is suitable for trusted applications, but is not recommended to isolate untrusted code. Because of the shared kernel space, process isolated containers 130 require the same kernel version and configuration. Network access for a process isolated container 130 is provided by a host vNIC 134. The host vNIC 134 receives network traffic from the virtual switch 122. In an implementation, the process isolated container 130 also includes a compartment 132 to provide TCPIP.sys isolation. Example process isolated containers include Windows Server containers and Linux containers (e.g., Kata containers).

A kernel isolated container 140 includes its own copy of an operating system kernel and has memory assigned directly to the kernel isolated container 140. A hypervisor provides CPU, memory and TO isolation (e.g., network and storage) for the kernel isolated container 140. Kernel isolated containers are also referred to as hypervisor isolated containers. Network access for the kernel isolated container 140 is provided by a virtual machine NIC (vmNIC) 146, a virtual machine bus (vmBUS) 144, and a network virtual service client device (netVSC device) 142. An example kernel isolated container 140 is a Hyper-V container.

A virtual machine 150 does not exactly meet the definition of a container in that a virtual machine 150 includes a complete operating system. In terms of network access, however, a virtual machine 150 also receives network access via a vmNIC 156, a vmBUS 154, and a netVSC device 152 provided by a hypervisor. Accordingly, from a networking perspective, a virtual machine is similar to a kernel isolated container. An example virtual machine includes a VMware virtual machine.

The host environment 100 provides advantages over hosting a guest application on a dedicated server. In particular, the host environment 100 allows multiple applications to be executed on the same physical hardware. The applications are isolated by the containers such that each application acts as if the application is the only application on the hardware. Further, because the applications are isolated within containers, the applications are portable between physical hardware. Additionally, the containers provide easy scalability by instantiating additional containers as needed.

The host environment 100, however, may experience various performance issues compared to a dedicated hardware server. For example, routing network traffic via the virtual switch 122 consumes resources of the physical processor 114 that could otherwise be used for the applications within the containers. Additionally, the routing by the virtual switch 122 is an additional hop for the network traffic adding latency. In an aspect, where the physical processor 114 is operating with few idle cycles (e.g., 70% busy), the virtual switch contributes to a long tail latency, where some packets wait for the virtual switch 122. Additionally, various hardware accelerations, direct memory access operations, and device memory-mapped input-output operations that are available on a dedicated server are not be available within a container via the virtual switch 122.

One technique that can improve network latency in a virtualized network is input-output virtualization (IOV) Virtual Functions (VFs) or single root (SR) IOV. SR-IOV is an extension to the PCI Express (PCIe) specification that allows a device such as a network adaptor (e.g., NIC) to separate access to its resources among various PCIe hardware functions. The PCIe hardware functions include a PCIe Physical Function (PF) and one or more PCIe Virtual Functions (VFs). The PF is the primary function of the device and advertises the device's SR-IOV capabilities. The PF is associated with the Hyper-V parent partition in a virtualized environment. Each VF is associated with the PF. A VF shares one or more physical resources of the device, such as a memory (e.g., memory 116) and a network port, with the PF and other VFs on the device. Each VF is associated with a Hyper-V child partition in a virtualized environment. Each PF and VF is assigned a unique PCI Express Requester ID (RID) that allows an I/O memory management unit (IOMMU) to differentiate between different traffic streams and apply memory and interrupt translations between the PF and VFs. This allows traffic streams to be delivered directly to the appropriate Hyper-V parent or child partition. As a result, non-privileged data traffic flows from the PF to VF without affecting other VFs. SR-IOV enables network traffic to bypass the software switch layer of the Hyper-V virtualization stack. Because the VF is assigned to a child partition, the network traffic flows directly between the VF and child partition. As a result, the I/O overhead in the software emulation layer is diminished and achieves network performance that is nearly the same performance as in non-virtualized environments.

Figure 2:
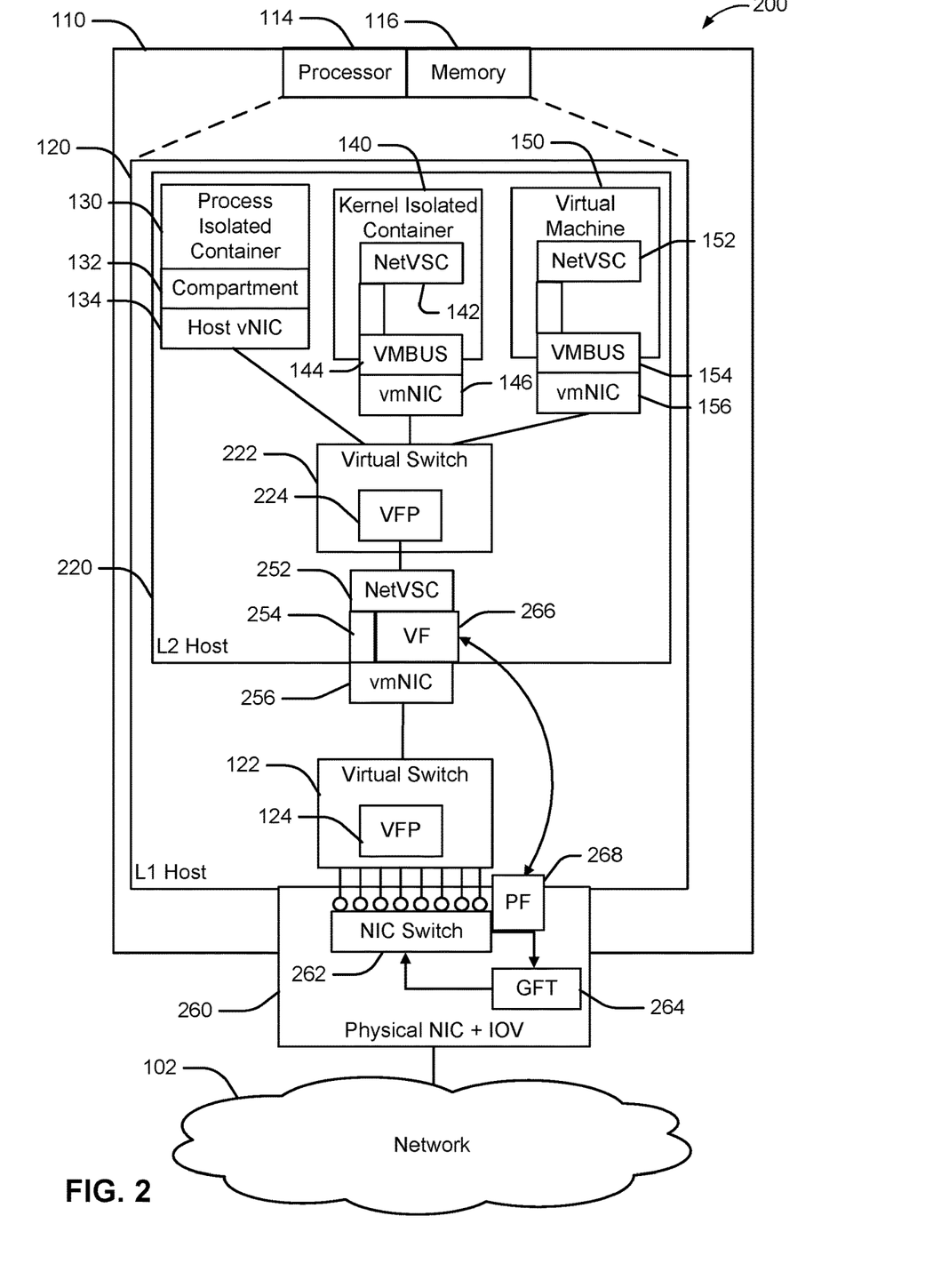
FIG. 2 is a schematic diagram of an example network architecture including containers nested within a virtual machine.

Referring to FIG. 2 an example multi-level host architecture 200 includes a layer 1 host 120 executed on a physical host 110 and a layer 2 host 220, which is a virtual machine on the layer 1 host 120. As a virtual machine, the layer 2 host 220 includes a virtual machine NIC 256, vmBUS 254, and netVSC device 252. For supporting containers, the layer 2 host 220 also includes a virtual switch 222 and a VFP 224. The multi-level host architecture 200 preserves a formally correct OSI Layer 2 network topology. The L1 Host 120 is analogous to an Aggregation Layer Switch. The L2 Host 220 is equivalent to a Top of Rack Switch (TOR). Lastly, a container is the endpoint, which is equivalent to a physical machine in a rack. The virtual switches 122, 222 effectively provide media access to the virtual and physical fabric for the container endpoints. This approach aids in compatibility, stability, diagnosis, and support. While many non-standard combinations are possible for performance reasons, correctness is a desirable quality to preserve a maintainable and extensible architecture with manageable test/validation costs.

The guest datapath is augmented with SR-IOV including a PF 268 and VFs 266. For example, a physical NIC 260 implements SR-IOV. The physical NIC 260 includes a NIC switch 262 that distributes network traffic to VFs 266. For example, a virtual function 266 is assigned to the L2 host 220. The physical NIC 260 identifies traffic for the virtual function 266 and route/copy data packets for the virtual function 266 directly to a memory assigned to the virtual function 266. Accordingly, the virtual function 266 allows traffic for the L2 host 220 to bypass the virtual switch 122.

However, since VFs bypass host mediated IO (e.g., the VFP 224 in the virtual switch 222), the host policies and ACLs will not apply for VF traffic. To secure VF traffic, the policies, rates, and resource caps are enforced through hardware mechanisms, which are implemented in the physical NIC 260 that includes IOV functionality.

The physical NIC 260 performs firewalling and controls what is placed on a fabric (e.g., NIC switch 262) via Generic Flow Tables (GFT) 264. The GFT 264 allows VFP 124 in virtual switch 122 to offload Policies/ACLs to the physical NIC 260 for controlling what the VF places on the fabric. The physical NIC 260 performs rate limiting of how much traffic is placed on the fabric. The NIC switch 262 performs hardware quality of service (QoS) that enables the ability to rate-limit traffic via send caps or reservation and receive caps on a per IEEE 802.1p, IP differentiated services code point (DSCP). Additionally, a Guest data center bridging (DCB) feature allows for last hop IEEE 802.1p and IP DSCP priority sanitization, as well as classification per stateful offloads such as remote direct memory access (RDMA). The classification is extensible to Internet Small Computer Systems Interface (iSCSI), Fibre Channel over Ethernet (FCoE), and similar stateful offloads. The physical NIC 260 enforces per tenant resource caps. Resource management encompasses host side control of how many physical NIC resources each VF is allowed to consume. Thus preventing noisy neighbor scenarios where a misbehaving VF drains all injectors or queueing points (QPs) or similar resources from the physical NIC 260, leaving other virtual machines unable to use NIC accelerations.

The architecture 200 improves latency to the L2 host 220, but is unable to provide hardware level access to the containers (e.g., process isolated container 130, kernel isolated container 140, or virtual machine 150). Due to the nested architecture, network traffic between the virtual function 266 and the containers still passes through the virtual switch 222 of the L2 host 220. More specifically, since the kernel isolated container 144 and the virtual machine 150 are isolated by the kernel or hypervisor, these containers cannot access a virtual function 266 even if a virtual function 266 were assigned to the specific container.

Figure 3:
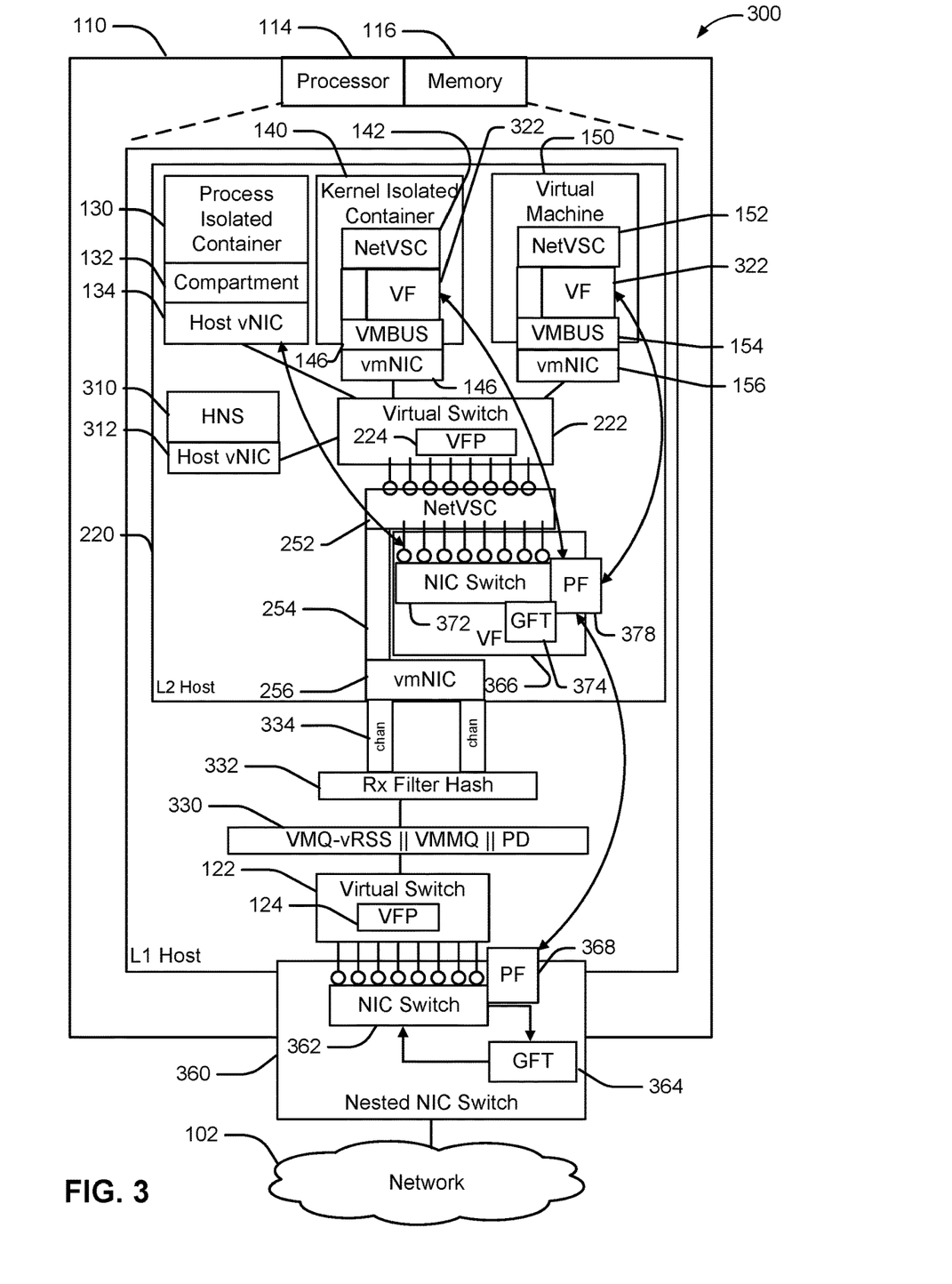
FIG. 3 is a schematic diagram of an example network architecture including kernel isolated containers nested within a virtual machine and assigned a virtual function for hardware access, in accordance with an implementation of the present disclosure.

Referring to FIG. 3 an example multi-level host architecture 300 includes a layer 1 host 120 executed on a physical host 110 and a layer 2 host 220, which is a virtual machine on the layer 1 host 120. The multi-level host architecture 300 includes multiple containers, including process isolated containers 130, kernel isolated containers 140, and virtual machines 150. The multi-level host architecture 300 provides the containers with hardware level access using a nested NIC Switch 360.

The nested NIC switch 360 is a physical NIC including two layers of NIC switches, NIC switch 362 and NIC switch 372. As such the nested NIC switch 360 can be considered a middlebox device. Each NIC switch implements SR-IOV and includes a physical function and multiple virtual functions. For example, the NIC switch 362 includes the physical function 368 and the virtual function 366. Additional virtual functions of the NIC switch 362 can be associated with additional L2 hosts (not shown). The NIC switch 262 is configured by the GFT 364 to route traffic according to policies and ACLs. The NIC switch 372 is associated with one of the virtual functions 366 of the NIC switch 362. Although illustrated within the L2 host 220, the NIC switch 362 is a physical switch within the nested NIC switch 360. That is, the NIC switch 362 routes data packets for the L2 host 220 to the virtual function 366 that is associated with the NIC switch 372 at a hardware level based on the GFT 374. The NIC switch 372 includes a physical function 378 and multiple virtual functions 322. The virtual functions 322 are assigned to the containers, specifically the kernel isolated containers 140. Accordingly, the NIC switch 372 routes data packets for the virtual functions 322 at the hardware level.

The synthetic datapath can be augmented with changes to the virtual switch 122 of L1 host 120 to steer ingress traffic to synthetic vPorts associated with vmBUS channels 334. Using virtual machine queues (VMQ) 330 with virtual receive side scaling (vRSS) or virtual machine multi-queues (VMMQ), the virtual switch 122 executes an Rx Filter hash 332 to redirect which L2 Host CPUs are used as indicated by L2 guest preferences. This entails exchanging the RSS indirection table preferences from L2 Guests through L2 Host virtual switch 222 and into its pNIC (i.e. NIC switch 372) by the NetVSC device 252. The NetVSC device 252 will propagate the indirection information to the L1 Host 120 such that receptions are redirected to the right VMBus channels 334 to mimic Synthetic vPorts in the L2 Host 220. The synthetic NicSwitch capability enables adding the physical NicSwitch capable virtual function 366 with hardware based vPort capabilities.

Additionally, the host network services (HNS) 310 manages the virtual switch 222, process isolated containers 130, kernel isolated containers 140, and virtual machines 150 based on requests from the containers via a host virtual NIC 312. The requests are within the L2 Host space. The NetVSC device 252 exposes an interface (e.g., an application programming interface (API)) for Nested GFT, Nested HWQoS, and similar features to secure the L2 Guests VF traffic. The L1 Host 120 includes drivers to support Nested GFT and Nested HWQoS management in the nested NIC switch 360 and to support (e.g., advertise) the physical functions 368, 378.

A process isolated container 130 can also leverage pseudo-direct HW access by bypassing the vSwitch and connecting directly to the vPorts on the NIC switch 372.

Injecting a VF into certain kernel isolated containers such as a Hyper-V containers is complicated by the Hyper-V container memory backing model. Such containers are backed by virtual memory that may be paged in or out of physical memory. Virtual memory allows for an increase in container density (e.g., the physical memory does not need to support the total memory allocated to all of the instantiated containers), but poses a problem for direct memory access operations. In particular, if a direct memory access operation is attempted while the virtual memory for the container is paged out of physical memory, the direct memory access operation will fail and can cause a system crash.

One proposal to allow direct memory access in virtual memory backed containers involves pending the direct memory access operation until the virtual memory is paged into physical memory. Current of IOV capable devices, however, do not include the ability to pend direct memory access operations. Moreover, pending direct memory access operations increases latency for such operations as the operation waits for the virtual memory to be paged in.

The present application provides for pinning a subset of the virtual memory addresses allocated to a kernel isolated container to a subset of physical memory addresses of a physical host. The host virtual machine allocates the virtual memory such that at least part of the physical computer memory is oversubscribed and the host virtual machine is configured to pin the subset of the virtual memory addresses to part of the physical memory which is not oversubscribed. The host virtual machine determines an amount of the subset of the physical memory addresses based on the direct memory access operation or device memory-mapped input-output operation configured for the respective container. The term "subset of virtual memory addresses" refers to at least one but fewer than all of the virtual memory addresses allocated to a kernel isolated container. Similarly, the term "subset of physical memory addresses of a physical host" refers to at least one physical memory address but fewer than all of the physical memory addresses of the physical host. The empty set is excluded from the definition of a subset. The term "oversubscribed" refers to a state in which a number of virtual memory addresses is greater than a number of physical memory addresses for a part of the physical computer memory.

Figure 4:
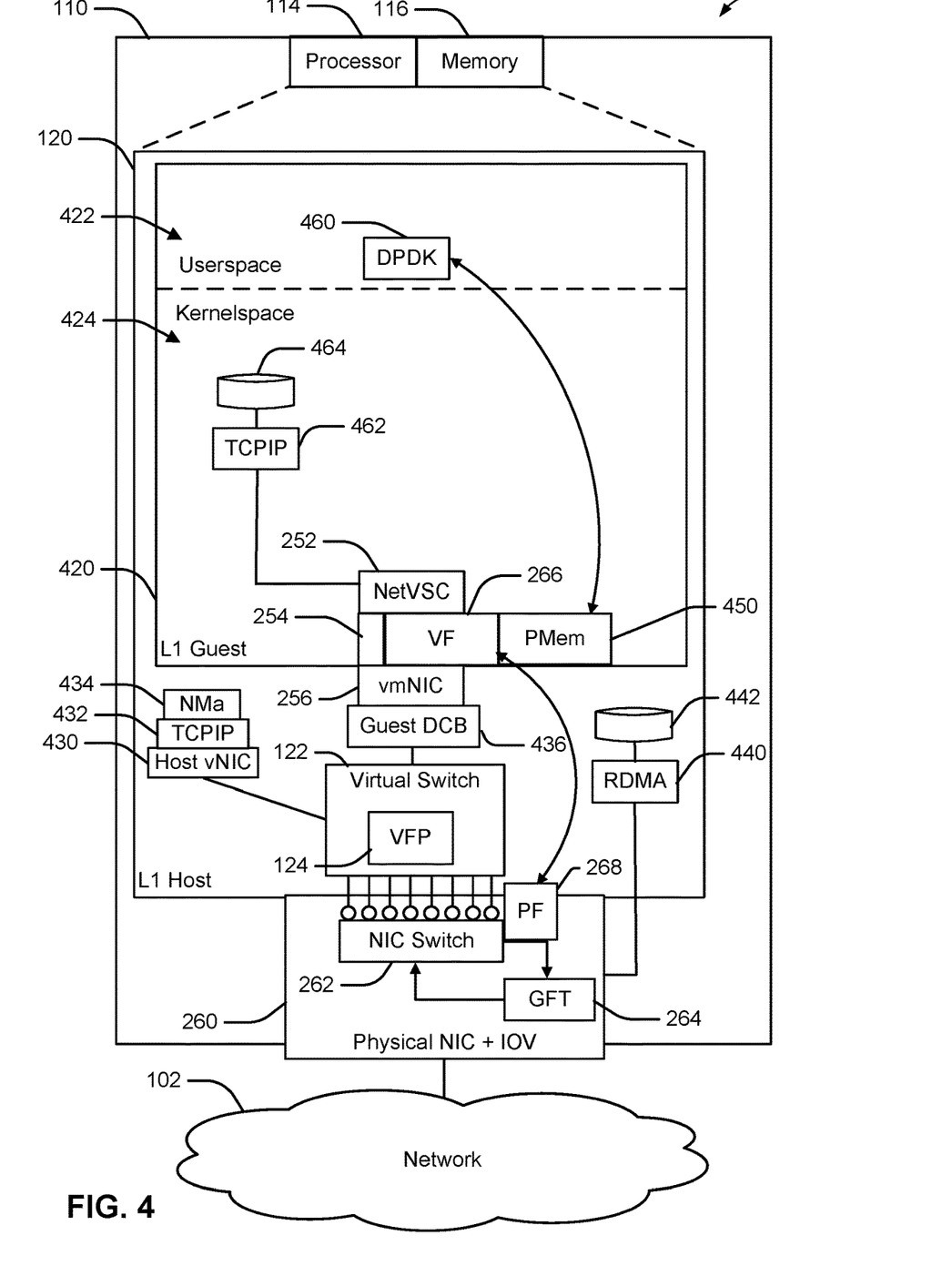

Turning to FIG. 4, an example host architecture 400 includes an L1 host 120 including at least one L1 guest 420, which is an example of a kernel isolated container 140. The L1 guest 420 includes a virtual function 266 that provides hardware level access to the physical NIC 260, processor 114, and memory 116. For example, the L1 guest 420 is allocated virtual memory and a subset of the virtual memory is pinned to a subset of physical memory 450 (e.g., a portion of the memory 116). In an implementation, the subset of physical memory 450 is associated with the virtual function 266. Pinning the subset of the virtual memory to the subset of physical memory can also be referred to as memory mapping. As illustrated, the L1 guest 420 is instantiated on the L1 host 120, but it should be appreciated that an L2 guest (e.g., kernel isolated container 140 in FIG. 3) can be instantiated on a virtual machine (e.g., L2 host 220) and assigned a virtual function 322 as discussed above with respect to FIG. 3.

The L1 host 120 includes a virtual switch 122 that distributes incoming data packets among guests such as the L1 guest 420. For example, each L1 guest 420 is associated with a virtual machine NIC 256 that receives the incoming data packets from the virtual switch 122. As discussed above, the virtual machine NIC 256 is augmented with a virtual function 266 that receives the data packets directly from the physical NIC switch 262. Each L1 guest 420 includes a netVSC device 252 that provides access to the virtual function 266. In an implementation, each L1 guest 420 is also associated with a guest data center bridge (DCB) 436. DCB 436 ensures that packets are assigned to traffic types which then can be provided QoS guarantees across the network.

The L1 host 120 includes a memory manager 434 that allocates virtual memory addresses to guests such as the L1 guest 420. The memory manager 434 also controls paging of virtual addresses into and out of the physical memory 116. In an implementation, the memory manager 434 pins virtual addresses to physical memory addresses. That is, the memory manager 434 determines that certain virtual addresses are at least temporarily fixed in the physical memory 116. For instance, the memory manager 434 does not page out such pinned virtual addresses. In an aspect, a virtual device driver of the L2 host 420 cab request virtual memory addresses to be pinned. For example, the virtual device driver represents a hardware driver that can perform a direct memory access on the physical memory 116. The memory manager 434 communicates with the virtual switch via a host virtual NIC 430 and TCPIP 432.

In an implementation, the L1 host 120 allows remote direct memory access (RDMA). The L1 host 120 include an RDMA controller 440 that receives RDMA requests and facilitates access to a physical memory 442.

The L1 guest 420 includes a userspace 422 and a kernelspace 424. The userspace 422 includes code for an application executed in the container. The kernelspace 424 includes code for the virtualized kernel elements of the L1 guest 420. The userspace 422 requests a direct memory access operation. For example, the userspace 422 includes a data plane development kit (DPDK) 460 that performs direct memory access operations. The DPDK 460 performs the direct memory access operations on the portion of physical memory 450 that is pinned to physical memory addresses of the memory 116. The portion of physical memory 450 is not oversubscribed and the virtual addresses allocated to the DPDK remain paged in to the memory 116. The kernelspace 424 generally provides access to a virtual memory 464 via TCPIP 462.

The amount of pinned memory per Hyper-V Container conflicts directly with container density. That is, mapping virtual memory for a container to a portion of the physical memory prevents oversubscribing of the portion of the physical memory and imposes a limit on the number of containers that can be instantiated on the physical host 110. In an implementation, the L1 host 120 limits the amount of virtual memory that can be pinned for a particular container. For example, the amount of memory can be based on an input-output technology used (e.g., Ethernet or RDMA), where one input-output technology requires less pinned memory than another input-output technology. Host client services (HCS) and host network service (HNS) mechanisms calculate and enforce the limits on the amount of mapped memory. For instance, for Ethernet, the amount of memory is based on a circular buffer list known a priori. The HNS can configure the circular buffer list using pinned memory and use quotas to enforce the a priori size of the buffer. For RDMA, the amount of memory may vary by application and pinning constructs. The HNS provides an API allowing the application to specify requirements for pinned memory.

As a detailed example, Ethernet virtual functions can be limited to approximately 9 MB of pinned memory for a default configuration. This size provides an out of box experience optimized for 40+ gigabits per second (Gbps) throughput. If a container image or profile is latency biased and has low throughput requirements, then the memory manager 434 can reduce the pinned memory requirement to approximately 3 MB. The aforementioned allocations may also be used for Linux Images in Hyper-V Containers. Scenarios such as DPDK behave in a similar way with the difference being additional long-term pinning of userspace buffers for packet processing. For example, the portion of physical memory 450, which is associated with the virtual function 266, can be persistently pinned to support the DPDK 460. For instance, the portion of physical memory 450 is allocated for the life of the container (e.g., L1 guest 420) based on the userspace 422 including DPDK 460. In another implementation, a separate portion of physical memory not associated with the virtual function 266 is pinned to support the DPDK 460.

As another example, the workload for remote direct memory access (RDMA) capable virtual functions is quite different from Ethernet. In RDMA scenarios, the entirety of container memory "could" be pinned. That is, the application may want to make any portion of its allocated memory available for RDMA access. Pinning the entire allocated memory, however, would greatly reduce container density and erode the benefits of container virtualization. Accordingly, the HCS/HNS identifies an allocation of pinned memory or a profile for container pinned memory relative to total container memory based on the specific container. For example, if the container profile indicates a need for direct memory access for strictly Windows SMB-Direct+RDMA inside the container, then the amount of pinned memory is similar to the Ethernet examples above. In contrast, if the container profile indicates a need for persistent memory (PMEM)+RDMA, the amount of pinned memory more closely approximates the entirety of the PMEM device assigned to the container. A large amount of memory reserved for backing a virtual PMEM device with physical memory reduces container density and memory overprovisioning. An allocation of pinned memory or profile for container pinned memory can be defined for both Windows and Linux images inside the Hyper-V Container.

Figure 5:
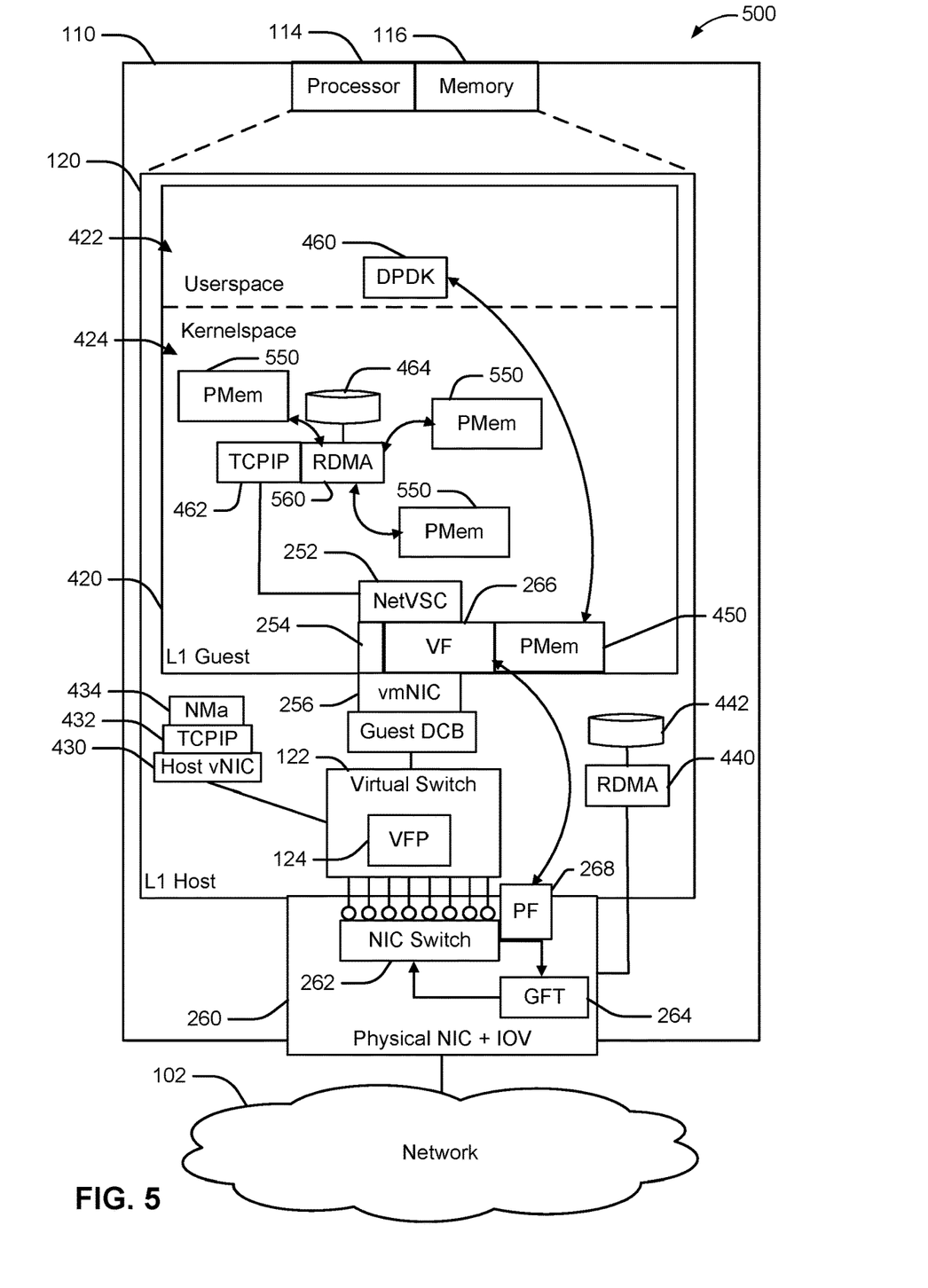

Turning to FIG. 5, another example host architecture 500 includes an L1 host 120 including at least one L1 guest 420 configured to perform RDMA. The host architecture 500 is similar to the host architecture 400, but can dynamically pin virtual memory to portions of physical memory 550. For example, the L1 guest 420 includes an RDMA component 560 that makes portions of virtual memory 464 available for RDMA requests received via TCPIP 462. The RDMA component 560 requests an allocation of pinned physical memory via the HCS/HNS, which enforces a total limit of pinned physical memory. The portions of physical memory 550 are temporarily pinned to the virtual memory addresses indicated by the RDMA component 560. In an implementation, the L1 guest 420 also includes the DPDK in the userspace 422, which may have a separate portion of physical memory 450 that is persistently pinned for DPDK operations.

Figure 6:
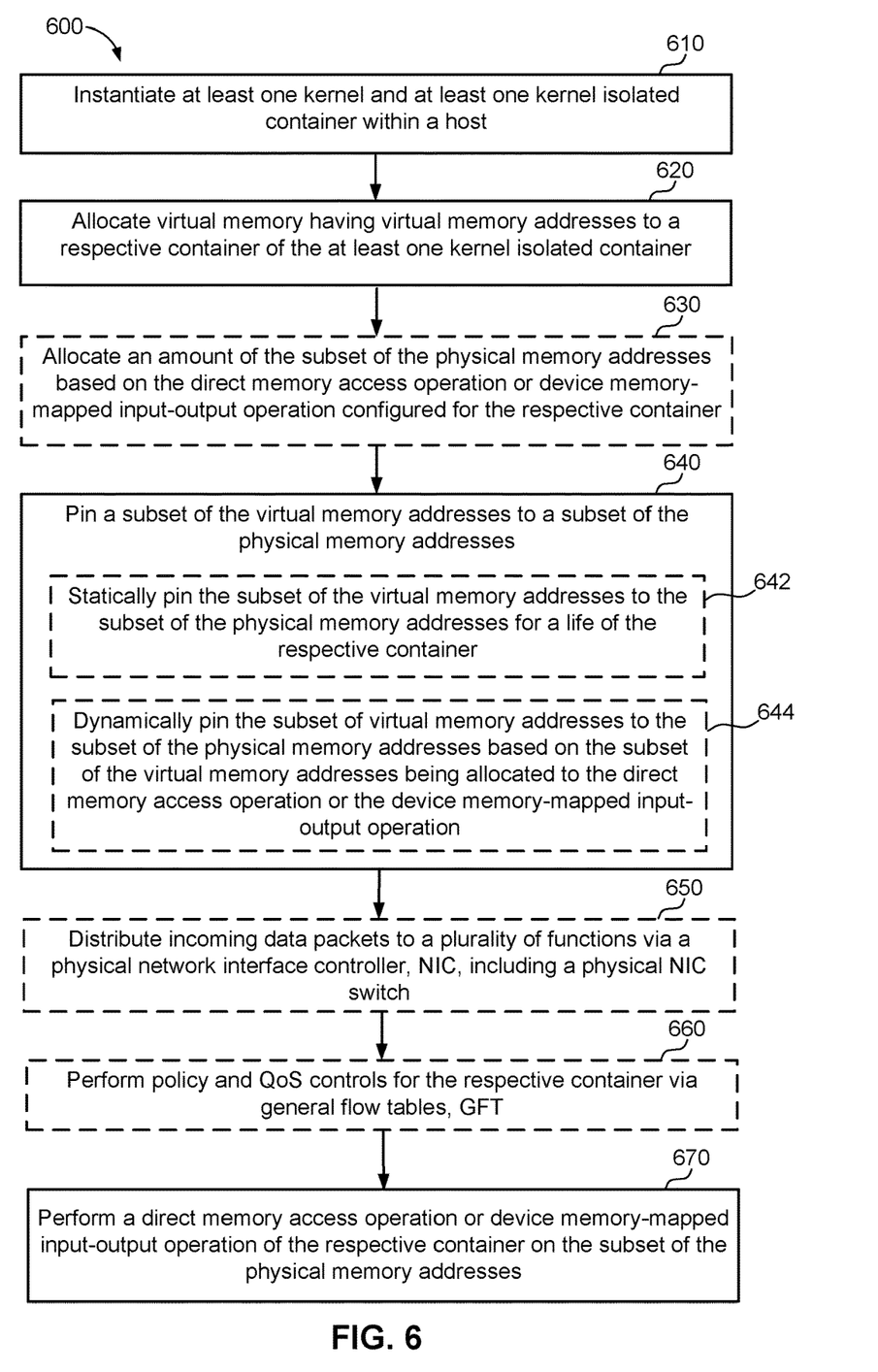
FIG. 6 is a flowchart of an example method of configuring a server for hosting kernel isolated containers, in accordance with an implementation of the present disclosure.

Turning to FIG. 6, an example method 600 hosts virtual memory backed kernel isolated containers. For example, method 600 can be performed by the host architecture 400 or the host architecture 500 on the physical host 110. Optional blocks are illustrated with dashed lines.

At block 610, the method 600 includes instantiating at least one kernel and at least one kernel isolated container within a host. In an implementation, for example, the host architecture 400, host architecture 500, or L1 host 120 instantiates, on a server (e.g., physical host 110) including a processor 114, a kernel isolated container 140 (e.g., L1 guest 420) within the L1 host 120. In another implementation, the host architecture 300 or L1 host 120 instantiates, on the physical host 110, a virtual machine (e.g., L2 host 220), and instantiate the kernel isolated container 140 on the L2 host 220 (for example, as illustrated in FIG. 3). The L1 host 120 and/or L2 host 220 includes instructions executable by the processor 114 to instantiate the kernel isolated container 140, which includes instructions for an application to be executed within the kernel isolated container. For example, the instantiated container includes the kernelspace 424 corresponding to the kernel and the userspace 422 corresponding to the application.

At block 620, the method 600 includes allocating virtual memory having virtual memory addresses to a respective container of the at least one kernel isolated container. In an implementation, for example, the L1 host 120 executes the memory manager 434 to allocate the virtual memory having virtual memory addresses for the userspace 422 and the kernelspace 424 to the respective container (e.g., L1 guest 420) of the at least one kernel isolated container. The virtual memory is in an amount requested by the L2 guest 420. That is, the memory manager 434 allocates the virtual memory addresses dynamically as requested by the L2 guest 420.

At block 630, the method 600 optionally includes allocating an amount of the subset of the physical memory addresses based on the direct memory access operation or device memory-mapped input-output operation configured for the respective container. In an implementation, for example, the L1 host 120 executes the memory manager 434 to allocate the amount of the subset of the physical memory 450 based on a direct memory access operation or device memory-mapped input-output operation configured for the L1 guest 420. For example, each L1 guest 420 has a profile indicating the allocation of pinned memory or a profile for container pinned memory. The memory manager 434 determines an amount of physical memory addresses to allocate to the L1 guest 420 based on the allocation or profile. For example, the allocation cab be a fixed amount for the container, or a profile indicating a ratio of allowable pinned physical memory addresses to total allocated virtual memory.

At block 640, the method 600 includes pinning a subset of the virtual memory addresses to a subset of the physical memory addresses. In an implementation, for example, the L1 host 120 executes the memory manager 434 to pin the subset of the virtual memory addresses to addresses the subset of the physical memory 450, 550. The memory manager 434 maintains a mapping of virtual memory addresses to physical memory addresses or virtual memory pages. When the memory manager 434 pins a virtual memory address to a physical memory address, the memory manager 434 locks an entry in the mapping such that the physical memory address is not replaced with a virtual memory page. That is, the memory manager 434 prevents the pinned virtual memory address from being paged out.

For example, at sub-block 642, in a first option, the memory manager 434 statically pins the amount of virtual memory addresses in the subset of the virtual memory addresses based on a size of a queue for a hardware operation to the subset of the physical memory addresses for a life of the respective container. For instance, the allocation or profile for the container indicates a use (e.g., a hardware operation such as Ethernet or DPDK) that requires regular access to the physical memory. Accordingly, when a container requests physical memory for such a use, the memory manager 434 statically pins the allocated virtual memory addresses to the allocated physical memory addresses for a life of the respective container.

As another example, at sub-block 644, for a second option, the memory manager 436 dynamically pins the subset of virtual memory addresses to the subset of the physical memory addresses based on the subset of the virtual memory addresses being allocated to the direct memory access operation or the device memory-mapped input-output operation. For instance, the allocation or profile for the container indicate a use (e.g., RDMA) that requires direct memory access for a specific portion of the virtual memory. The memory manager 434 receives a request for physical memory from a virtual device driver (e.g., RDMA component 560) via an application programming interface receiving memory requirements of the respective container. The memory manager 434 dynamically pins a subset of physical memory 550 when requested. The memory manager 434 can unpin the subset of physical memory 550, for example, when the L1 guest 420 deallocates the pinned virtual memory addresses. The memory manager 434 also pins a different subset of physical memory 550 if the L1 guest 420 requests additional pinned memory.

At block 650, the method 600 optionally includes distributing incoming data packets to a plurality of functions via a physical network interface controller, NIC, including a physical NIC switch. In an implementation, for example, the physical NIC 260 including the physical NIC switch 262 distributes incoming data packets to the plurality of functions. At least one of the functions is the virtual function 266 that is associated with the L1 guest 420. Accordingly, the physical NIC 260 distributes an incoming data packet for the L1 guest 420 directly to the portion of physical memory 450 that is allocated to the L1 guest 420 and pinned to the virtual memory of the L1 guest 420.

At block 660, the method 600 optionally includes performing policy and QoS controls for the respective container via GFT. For instance, the physical NIC 260 including the GFT 264 and the physical NIC switch 262 perform policy and QoS controls for the respective container. The GFT 264 is configured based on policies (e.g., access control lists) and QoS controls for the container (e.g., L1 host 420). Accordingly, the physical NIC switch 262 implements the policy and QoS controls according to the GFT 264. For example, the NIC switch 262 discards packets that do not satisfy the rules in the GFT 264 or queues packets and services the queues to satisfy the QoS controls.

At block 670, the method 600 includes performing a direct memory access operation or device memory-mapped input-output operation of the respective container on the subset of the physical memory addresses. In an implementation, for example, the L2 guest 420 performs the direct memory access operation or the device memory-mapped input-output operation of the respective container on the subset of the physical memory 450, 550. For example, the L2 guest 420 executes the DPDK to perform a DPDK operation on the subset of physical memory 450. As another example, the L2 guest 420 executes the RDMA component 560 to configure the subset of the physical memory 550 for RDMA operations. The L1 host then receives a RDMA request and allows the direct memory access to the specified subset of the physical memory 550, e.g., by copying the subset of the physical memory 550 to or from one or more TCPIP packets.

Figure 7:
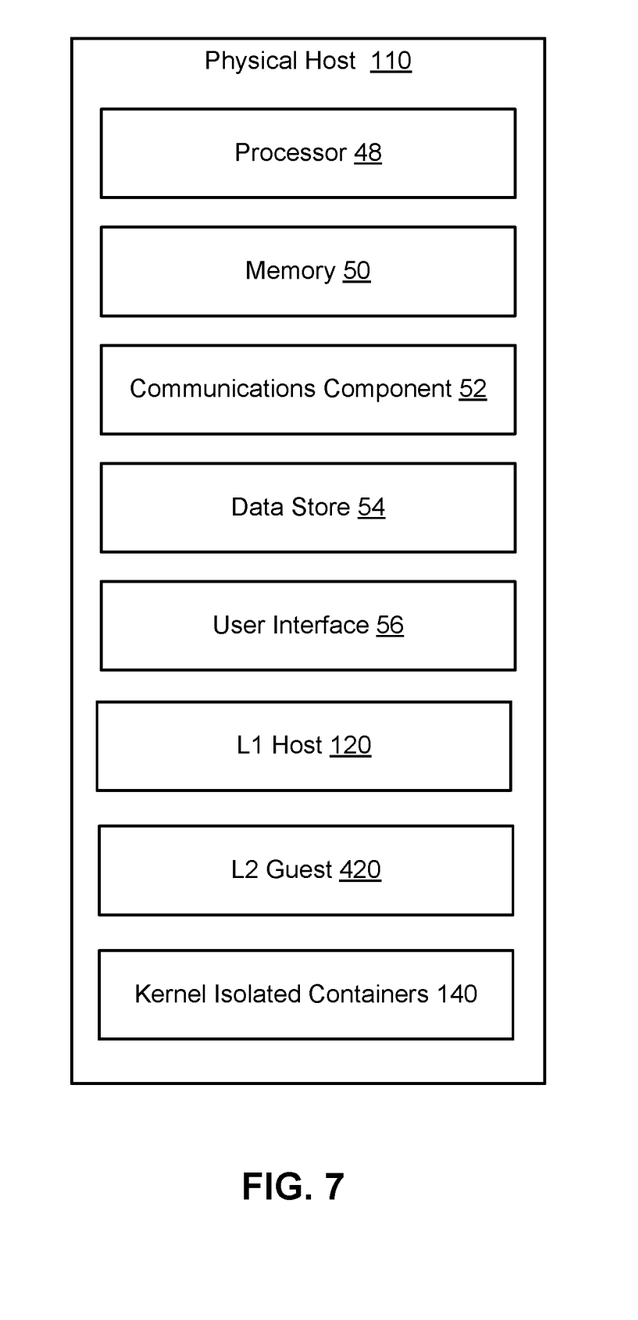
FIG. 7 is a schematic block diagram of an example computer device, in accordance with an implementation of the present disclosure.

Referring now to FIG. 7, illustrated is an example physical host 110 in accordance with an implementation, including additional component details as compared to FIG. 1. In one example, physical host 110 includes processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 includes the physical processor 114.

In an example, physical host 110 includes memory 50 for storing instructions executable by the processor 48 for carrying out the functions described herein. In an implementation, for example, memory 50 includes memory 116. The memory 50 includes instructions for executing the L1 host 120, L2 host 220, and any containers within the L2 host 220.

Further, physical host 110 includes a communications component 52 that provides for establishing and maintaining communications with one or more parties utilizing hardware, software, and services as described herein. Communications component 52 carries communications between components on physical host 110, as well as between physical host 110 and external devices, such as devices located across a communications network and/or devices serially or locally connected to physical host 110. For example, communications component 52 includes one or more buses, and may further include transmit chain components and receive chain components associated with a transmitter and receiver, respectively, operable for interfacing with external devices.

Additionally, physical host 110 includes a data store 54, which can be any suitable combination of hardware and/or software, that provides for mass storage of information, databases, and programs employed in connection with implementations described herein. For example, data store 54 can be a data repository for L1 host 120, L2 host 220, and/or containers. The data store 54 includes memory 116 and/or a storage device.

Physical host 110 can also include a user interface component 56 operable to receive inputs from a user of physical host 110 and further operable to generate outputs for presentation to the user. User interface component 56 includes one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 includes one or more output devices, including but not limited to a display, a speaker, a haptic feedback mechanism, a printer, any other mechanism capable of presenting an output to a user, or any combination thereof.

In an implementation, user interface component 56 transmits and/or receives messages corresponding to the operation of L1 host 120 and/or L1 guest 420. In addition, processor 48 executes L1 host 120 and/or L1 guest 420, and memory 50 or data store 54 stores them.

As used in this application, the terms "component," "system" and the like are intended to include a computer-related entity, such as but not limited to hardware, firmware, a combination of hardware and software, software, or software in execution. For example, a component includes, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features have been presented in terms of systems that include a number of devices, components, modules, and the like. A person skilled in the art should understand and appreciate that the various systems can include additional devices, components, modules, etc. and/or may not include all of the devices, components, modules etc. discussed in connection with the figures. A combination of these approaches can also be used.

The various illustrative logics, logical blocks, and actions of methods described in connection with the embodiments disclosed herein can be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor includes a microprocessor, but, in the alternative, the processor can be any conventional processor, controller, microcontroller, or state machine. A processor can also be implemented as a combination of computer devices, e.g., a combination of a DSP and a microprocessor, a plurality of microprocessors, one or more microprocessors in conjunction with a DSP core, or any other such configuration. Additionally, at least one processor can comprise one or more components operable to perform one or more of the steps and/or actions described above.

Further, the steps and/or actions of a method or procedure described in connection with the implementations disclosed herein can be embodied directly in hardware, in a software module executed by a processor, or in a combination of the two. A software module resides in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium can be integral to the processor. Further, in some implementations, the processor and the storage medium reside in an ASIC. Additionally, the ASIC can reside in a user terminal. In the alternative, the processor and the storage medium can reside as discrete components in a user terminal. Additionally, in some implementations, the steps and/or actions of a method or procedure may reside as one or any combination or set of codes and/or instructions on a machine readable medium and/or computer readable medium, which can be incorporated into a computer program product.

In one or more implementations, the functions described can be implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above can be made without departing from the scope hereof. Other implementations will be apparent to those skilled in the art from a consideration of the specification or from a practice in accordance with examples disclosed herein.

Some Further Example Implementations

An example server for hosting kernel isolated containers, comprising: at least one physical processor; at least one physical computer memory addressable via physical memory addresses, the at least one physical computer memory storing executable code for execution by the at least one physical processor, the executable code configured to provide at least one host including a kernel and at least one kernel isolated container within the at least one host, wherein the executable code providing the at least one host is configured to: allocate virtual memory having virtual memory addresses to a respective container of the at least one kernel isolated container; pin a subset of the virtual memory addresses to a subset of the physical memory addresses; and perform a direct memory access operation or device memory-mapped input-output operation of the respective container on the subset of the physical memory addresses. The direct memory access operation or device memory-mapped input-output operation improves latency and speed by bypassing the virtual switch protocol stacks. By pinning the virtual memory addresses of the container to physical memory addresses, the direct memory access operation or device memory-mapped input-output operation can be performed without crashing a system because the virtual memory addresses are paged out of physical memory.

The above example server, wherein the at least one host is configured to allocate the virtual memory such that at least part of the at least one physical computer memory is oversubscribed and the at least one host is configured to pin the subset of the virtual memory addresses to part of the at least one physical computer memory which is not oversubscribed. Accordingly, the server obtains the benefits of both oversubscription and DMA and MIMO operations.

Any of the above example servers, wherein an amount of the subset of the physical memory addresses is allocated based on the direct memory access operation or device memory-mapped input-output operation configured for the respective container. Accordingly, by controlling the amount of the subset of the physical memory addresses that are pinned, the server maintains a larger portion of the physical memory that is oversubscribed.

Any of the above example servers, wherein the subset of the virtual memory addresses is statically pinned to the subset of the physical memory addresses for a life of the respective container. Statically pinning the virtual memory addresses to the subset of the physical memory addresses fixes the amount of pinned memory and is suitable for predictable memory uses such as Ethernet and DPDK operations.

Any of the above example servers, wherein the subset of the virtual memory addresses is dynamically pinned to the subset of the physical memory addresses based on the subset of the virtual memory addresses being allocated to the direct memory access operation or the device memory-mapped input-output operation. Dynamically pinning the memory addresses allows a flexible approach for operations such as RDMA.

Any of the above example servers, further comprising a physical network interface controller, NIC, including a physical NIC switch configured to distribute incoming data packets to a plurality of functions, wherein the plurality of functions includes a physical function and virtual functions, at least one of the virtual functions assigned to the respective container within the at least one host. The virtual functions of the physical NIC allow hardware level routing of packets to the pinned memory to improve speed of DMA or MMIO operations.

The above example server, wherein the physical NIC switch is configured to perform policy and quality of service, QoS, controls for the respective container via general flow tables, GFT. Accordingly, the policy and QoS controls secure and balance the traffic at a hardware level, which reduces operations performed by the virtual switch and makes processor cycles available to the containers.

Any of the above example servers, wherein the executable code providing the at least one host is configured to pin the subset of the virtual memory addresses to the subset of the physical memory addresses in response to a hardware driver request of the respective container. Accordingly, from the perspective of the container, the request for pinned memory is similar to a request on a dedicated hardware server (i.e., hardware requests are via a hardware driver).

An example method of hosting kernel isolated containers on a server including at least one physical processor and at least one physical computer memory addressable via physical memory addresses, the method comprising: instantiating at least one kernel and at least one kernel isolated container within a host; allocating virtual memory having virtual memory addresses to a respective container of the at least one kernel isolated container; pinning a subset of the virtual memory addresses to a subset of the physical memory addresses; and performing a direct memory access operation or device memory-mapped input-output operation of the respective container on the subset of the physical memory addresses.

The above example method, further comprising allocating an amount of the subset of the physical memory addresses based on the direct memory access operation or device memory-mapped input-output operation configured for the respective container.

Any of the above example methods, wherein pinning the subset of virtual memory addresses to the subset of the physical memory addresses comprises statically pinning the amount of virtual memory addresses in the subset of the virtual memory addresses based on a size of a queue for a hardware operation to the subset of the physical memory addresses for a life of the respective container.

Any of the above example methods, wherein pinning the subset of virtual memory addresses to the subset of the physical memory addresses comprises dynamically pinning the subset of virtual memory addresses to the subset of the physical memory addresses based on the subset of the virtual memory addresses being allocated to the direct memory access operation or the device memory-mapped input-output operation.

Any of the above example methods, further comprising distributing incoming data packets to a plurality of functions via a physical network interface controller, NIC, including a physical NIC switch, wherein the plurality of functions includes a physical function and virtual functions, at least one of the virtual functions is assigned to the respective container within the host.

Any of the above example methods, wherein pinning the subset of the virtual memory addresses to the subset of the physical memory addresses is in response to a hardware driver request of the respective container.

An example non-transitory computer-readable medium storing computer executable instructions for performing any of the above example methods.

What is claimed is:

1. A server for hosting at least one kernel isolated container, comprising:
   at least one physical processor; and
   at least one physical computer memory addressable via physical memory addresses, the at least one physical computer memory storing executable code for execution by the at least one physical processor, the executable code providing at least one host including a kernel and the at least one kernel isolated container within the at least one host, wherein the executable code providing the at least one host is configured to:
   allocate virtual memory having virtual memory addresses to a respective kernel isolated container of the at least one kernel isolated container;
   pin a subset of the virtual memory addresses to a subset of the physical memory addresses, wherein:
      the subset of the virtual memory addresses includes at least one but fewer than all of the virtual memory addresses allocated to the respective kernel isolated container; and
      an amount of the subset of virtual memory addresses that is pinned is limited based on an input-output technology used by the respective kernel isolated container; and
   perform a direct memory access operation or a device memory-mapped input-output operation for the respective kernel isolated container on the subset of the physical memory addresses.

2. The server of claim 1, wherein the executable code providing the at least one host is configured to allocate virtual memory such that at least part of the at least one physical computer memory is oversubscribed and the subset of the virtual memory addresses pinned to the at least part of the at least one physical computer memory which is not oversubscribed.

3. The server of claim 1, wherein the amount of the subset of the physical memory addresses is allocated based on the direct memory access operation or the device memory-mapped input-output operation for the respective kernel isolated container.

4. The server of claim 1, wherein the subset of the virtual memory addresses is statically pinned to the subset of the physical memory addresses for a life of the respective kernel isolated container.

5. The server of claim 1, wherein the subset of the virtual memory addresses is dynamically pinned to the subset of the physical memory addresses based on the subset of the virtual memory addresses being allocated to the direct memory access operation or the device memory-mapped input-output operation.

6. The server of claim 1, further comprising a physical network interface controller (NIC) including a physical NIC switch configured to distribute incoming data packets to a plurality of functions, wherein the plurality of functions includes a physical function and a virtual function assigned to the respective kernel isolated container within the at least one host.

7. The server of claim 6, wherein the physical NIC switch is configured to perform policy and quality of service (QoS) controls for the respective kernel isolated container via general flow tables (GFT).

8. The server of claim 1, wherein the executable code providing the at least one host is configured to pin the subset of the virtual memory addresses to the subset of the physical memory addresses in response to a hardware driver request of the respective kernel isolated container.

9. A method of hosting at least one kernel isolated container on a server including at least one physical processor and at least one physical computer memory addressable via physical memory addresses, the method comprising:
   instantiating at least one kernel and the at least one kernel isolated container within a host;

allocating virtual memory having virtual memory addresses to a respective kernel isolated container of the at least one kernel isolated container;
pinning a subset of the virtual memory addresses to a subset of the physical memory addresses, wherein:
the subset of the virtual memory addresses includes at least one but fewer than all of the virtual memory addresses allocated to the respective kernel isolated container; and
an amount of the subset of virtual memory addresses that is pinned is limited based on an input-output technology used by the respective kernel isolated container; and
performing a direct memory access operation or a device memory-mapped input-output operation for the respective kernel isolated container on the subset of the physical memory addresses.

10. The method of claim 9, further comprising allocating the amount of the subset of the physical memory addresses based on the direct memory access operation or the device memory-mapped input-output operation for the respective kernel isolated container.

11. The method of claim 10, wherein the subset of virtual memory addresses is statically pinned to the subset of the physical memory addresses based on a size of a queue for a hardware operation to the subset of the physical memory addresses for a life of the respective kernel isolated container.

12. The method of claim 10, wherein the subset of virtual memory addresses is dynamically pinned to the subset of the physical memory addresses based on the subset of the virtual memory addresses being allocated to the direct memory access operation or the device memory-mapped input-output operation via an application programming interface receiving memory requirements of the respective kernel isolated container.

13. The method of claim 9, further comprising distributing incoming data packets to a plurality of functions via a physical network interface controller (NIC) including a physical NIC switch, wherein the plurality of functions includes a physical function and a virtual function assigned to the respective kernel isolated container within the host.

14. The method of claim 9, wherein pinning the subset of the virtual memory addresses to the subset of the physical memory addresses is in response to a hardware driver request of the respective kernel isolated container.

15. A non-transitory computer-readable medium storing computer executable instructions that, when executed by a processor of a server including at least one physical processor and at least one physical computer memory addressable via physical memory addresses, cause the server to:
instantiate at least one kernel and at least one kernel isolated container within a host;
allocate virtual memory having virtual memory addresses to a respective kernel isolated container of the at least one kernel isolated container;
pin a subset of the virtual memory addresses to a subset of the physical memory addresses, wherein:
the subset of the virtual memory addresses includes at least one but fewer than all of the virtual memory addresses allocated to the respective kernel isolated container; and
an amount of the subset of virtual memory addresses that is pinned is limited based on an input-output technology used by the respective kernel isolated container; and
perform a direct memory access operation or a device memory-mapped input-output operation for the respective kernel isolated container on the subset of the physical memory addresses.

16. The non-transitory computer-readable medium of claim 15, further comprising instructions to allocate the amount of the subset of the physical memory addresses based on the direct memory access operation or the device memory-mapped input-output operation for the respective kernel isolated container.

17. The non-transitory computer-readable medium of claim 16, wherein the subset of virtual memory addresses is statically pinned to the subset of the physical memory addresses based on a size of a queue for a hardware operation to the subset of the physical memory addresses for a life of the respective kernel isolated container.

18. The non-transitory computer-readable medium of claim 16, wherein the subset of virtual memory addresses is dynamically pinned to the subset of the physical memory addresses based on the subset of the virtual memory addresses being allocated to the direct memory access operation or the device memory-mapped input-output operation via an application programming interface receiving memory requirements of the respective kernel isolated container.

19. The non-transitory computer-readable medium of claim 15, further comprising instructions to distribute incoming data packets to a plurality of functions via a physical network interface controller (NIC) including a physical NIC switch, wherein the plurality of functions includes a physical function and a virtual function assigned to the respective kernel isolated container within the host.

20. The non-transitory computer-readable medium of claim 15, wherein pinning the subset of the virtual memory addresses to the subset of the physical memory addresses is in response to a hardware driver request of the respective kernel isolated container.

* * * * *